United States Patent Office 2,736,753
Patented Feb. 28, 1956

2,736,753

RECOVERY OF PHENOLS

David Ian Hutchinson Jacobs, Upper Pine, Woodmansterne, England, assignor, by mesne assignments, to Hercules Powder Company, a corporation of Delaware No Drawing. Application September 9, 1953,
Serial No. 379,307

Claims priority, application Great Britain
September 10, 1952

7 Claims. (Cl. 260—621)

The present invention relates to the manufacture of dihydric phenols, and in particular to the recovery and isolation of resorcinol prepared by the cleavage of meta-di-isopropylbenzene dihydroperoxide.

Resorcinol may be prepared by the oxidation of meta-di-isopropylbenzene to give an oxidate containing meta-di-isopropyl benzene dihydroperoxide from which the dihydroperoxide may be separated by extraction with alkali, or by distilling off the hydrocarbon and other relatively volatile material, and subsequently catalytically cleaved to give a reaction product containing resorcinol. Alternatively the oxidate may be subjected to catalytic cleavage of the hydroperoxide contained in it without separation.

The present invention is based on the discovery that the residue which remains after the removal of resorcinol and low boiling substances from such reaction products contains materials which, when thermally decomposed, yield additional quantities of resorcinol together with meta-isopropenyl phenol.

Accordingly, the present invention, in the process for the manufacture of resorcinol by the catalytic cleavage of a reaction mixture containing meta-di-isopropylbenzene dihydroperoxide derived from the oxidation of meta-di-isopropylbenzene, comprises decomposing by the action of heat the material contained in the cleavage reaction product which is less volatile than resorcinol and recovering the additional quanities of resorcinol and the meta-isopropenyl phenol so formed.

In a preferred embodiment of the invention, the material contained in the cleavage reaction product which is less volatile than resorcinol is decomposed by the action of heat in the presence of a high-boiling substance which is substantially inert to the resorcinol, and the resorcinol and the meta-isopropenyl phenol so formed are simultaneousely or subsequently distilled off and recovered from the distillate. In another embodiment in which distillation of the resorcinol and meta-isopropenyl phenol formed by the heat treatment is subsequent to the said heat treatment a high-boiling, inert substance may be used in the distillation stage whether or not it has been used in the heating stage.

The reaction product resulting from the catalytic cleavage of a reaction mixture containing meta-di-isopropylbenzene dihydroperoxide derived from the oxidation of meta-di-isopropylbenzene contains, in addition to resorcinol and material less volatile than resorcinol (which probably comprises a high-boiling condensation product of resorcinol with meta-isopropenyl phenol), acetone and the cleavage catalyst. This product, before being processed according to the present invention, is preferably first treated to remove or neutralise the catalyst and stripped of low boiling materials such as acetone. Then the heat treatment may be carried out before removal, for instance by distillation, sublimation or extraction, of any resorcinol, or some or all of the free resorcinol may be removed prior to the heat treatment. In the preferred embodiment mentioned above the heat treatment of the cleavage reaction product is carried out in the presence of a high-boiling inert substance and the resorcinol and the meta-isopropenyl phenol so formed are simultaneously or subsequently distilled and recovered from the distillate.

The heat treatment in accordance with the process of the present invention is advantageously effected at a temperature in the liquid mixture between about 200° and 400° C. Lower or higher temperatures may be used if desired, but at temperatures below 200° C. the decomposition of the material less volatile than resorcinol may not proceed to completion. While it is preferred to carry out the heat decomposition treatment merely by heating to the temperatures within the limits mentioned without the addition of special catalysts, the reaction may be promoted by the addition of catalysts whereby somewhat lower temperatures may be used. Suitable catalysts are, for instance, acidic materials such as sulphuric acid and other mineral acids, and activated earths having an acidic reaction. Such catalysts, however, have a tendency to cause polymerisation of other substances formed by the heat decomposition such as the meta-isopropenylphenol, the isolation of which forms an important contribution to the economy of the whole process.

When the process is being carried out in the absence of any inert high-boiling entrainer the heat treatment may be carried out at any convenient pressure, and sub-atmospheric pressures are useful owing to the high boiling point of resorcinol. Pressures of 10 mm. of mercury and lower may be used with advantage. In this way it is possible to distil over the resorcinol and meta-isopropenyl phenol as soon as they are formed by the thermal decomposition process. The operation may conveniently be carried out in the kettle of the still used for fractionating the product of the decomposition reaction. For instance, after low boiling materials have been removed, the pressure may be reduced and a fraction containing resorcinol collected. Then, when part or all of the free resorcinol has been removed, the kettle temperature is allowed to rise until cracking of the material less volatile than resorcinol takes place, whereby meta-isopropenylphenol and additional quantities of resorcinol are produced. Alternatively, if the whole distillation is carried out at increased pressures, the heat treatment may precede the collection of any resorcinol, and a fraction comprising meta-isopropenylphenol collected followed by the resorcinol. Since, however, the resorcinol and meta-isopropenylphenol show a tendency to recombine and the meta-isopropenylphenol also shows a tendency to polymerise, the heat treatment can with advantage be carried out in a flash boiler from which the vaporised material is led into the upper part of a fractionating column, whereby the meta-isopropenylphenol is taken as an overhead fraction while the resorcinol is removed from the bottom.

If the products obtained from the decomposition operation are not isolated separately they may be separated at a later stage by using a selective solvent for one or other of the components. For instance, the meta-isopropenylphenol may be separated from the resorcinol by extraction with benzene, toluene, methylnaphthalene, chloroform or carbon tetrachloride or a separation may be achieved by partition between, say, water and one of these solvents. In a particular embodiment the products obtained from the decomposition operation are flash distilled and the vapours condensed by contacting with water, followed by the selective extraction of the meta-isopropenyl phenol from the aqueous phase by means of a solvent such as those mentioned above. The aqueous phase containing the resorcinol is advantageously redistilled or sublimed to recover the pure material.

A preferred embodiment of the invention comprises carrying out the heat treatment of the cleavage reaction product (suitably treated to separate or neutralise the decomposition catalyst and to strip off low boiling materials such as acetone) in the presence of a high-boiling substance which is substantially inert to the resorcinol, simultaneously or subsequently distilling off the resorcinol and the meta-isopropenyl phenol so formed, and recovering the resorcinol and the meta-isopropenylphenol from the distillate. The inert substance may form a minimum-boiling azeotrope with the resorcinol but other high-boiling substances which do not form azeotropes therewith also give satisfactory results. However, substances which form maximum-boiling azeotropes with the resorcinol are not so suitable since the recovery of all the resorcinol in such a case will necessitate removing all the liquid substance from the distillation vessel with consequent baking of residues on to the surfaces and heating coils of the distillation vessel. Inert substances which it is preferred to use are those boiling above 200° C. at atmospheric pressure and include gas oil (for instance a fraction boiling between 100° and 200° C. at a pressure of 12 mm. of mercury), triisopropylbenzene, methylnaphthalene, isopropylnaphthalene, chloronaphthalene, bromonaphthalene, and 1:2:4-trichlorobenzene, or mixtures of these liquids.

The amount of inert substance employed in a batch process may vary within wide limits but it should preferably be such that some remains in the kettle when all the dihydric phenol has been removed in order to prevent the formation of hard, insoluble tars on the walls and heating coils of the kettle. Although the by-products may be relatively insoluble in the inert substance the presence of the latter appears to prevent their deposition on the heating surfaces where they would subsequently become baked hard. In a batch distillation the tarry materials may be separated from the inert substance by decantation at the end of the distillation and the substance re-used; this is especially the case when naphthalene derivatives are employed as the inert substance.

The inert substance may be present during the step of catalytically cleaving the hydroperoxide or it may be added to the crude reaction product from this stage after which the mixture after treatment to separate or neutralise the cleavage catalyst and to remove low-boiling materials is submitted to the heat-treatment whereby the thermal decomposition reaction is effected, and the resorcinol and the meta-isopropenylphenol so formed are distilled off and recovered. Alternatively, the cleavage product, treated for neutralisation or separation of catalyst and stripped free from low-boiling materials may be fed, either alone or admixed with some of the inert substance into the column of a still up which the inert substance is being distilled at a temperature sufficient to effect the decomposition; and suitably above about 200° C., and the resorcinol and the meta-isopropenylphenol recovered overhead while the tarry by-products pass down the column into the kettle; such a system can, of course, be readily adapted to continuous working. A further method of continuous operation is to feed the cleavage product (which has been treated to remove the cleavage catalyst and stripped of low-boiling materials), together with the inert substance into a stirred kettle from which the resorcinol and the meta-isopropenylphenol are recovered by distillation at a temperature sufficient to effect the decomposition and suitably above about 200° C. and the tarry by-products and part of the inert substance fed are withdrawn intermittently or continuously from the kettle. Other methods of operation can of course, be employed.

The distillate obtained may, when hot, be either homogeneous (e. g. when alpha- or beta-methylnaphthalene is used) or heterogeneous (e. g. when gas-oil is used). In both cases it may be cooled to crystallise the resorcinol present in it and the crystals recovered by filtration, washed with a low-boiling solvent such as low-boiling light petroleum, and dried. If the distillate is initially heterogeneous or becomes heterogeneous on cooling before crystallisation occurs, the resorcinol layer may be decanted in liquid form and subsequently allowed to cool and crystallise. If desired the liquid resorcinol may be treated so that traces of solvent are distilled off and the main bulk of the material then cooled and allowed to crystallise. It is, however, preferred to operate the process so that the distillate, when hot, is homogeneous, and so that, on cooling, the resorcinol crystallises directly from solution rather than separating first as a molten resorcinol phase. This can be readily achieved by adjusting the proportion of the inert substance in the mixture fed to the still and if necessary by adding inert substance to the distillate so that the distillate is not saturated with respect to resorcinol while still above the temperature at which crystallisation takes place. By carrying out the process in this way a purer sample of resorcinol results than would be obtained if the resorcinol were first allowed to separate as a liquid phase, since in the latter case some of the meta-isopropenyl phenol would tend to dissolve in the liquid resorcinol, giving rise to impure crystals of resorcinol.

The inert substance mother-liquors still contain dissolved resorcinol, after the bulk of the latter has been crystallised and filtered off, together with the meta-isopropenyl phenol. If desired part or (in a batch distillation) all of these mother-liquors may be recycled to the distillation kettle, in the latter case the distillate being treated for the recovery of dissolved resorcinol and meta-isopropenyl phenol when no more resorcinol crystallises from the distillate on cooling. The dissolved resorcinol may be recovered from the inert substance mother-liquors by solvent extraction, for example by extraction with water when an aqueous phase is obtained together with a resorcinol-free inert substance phase. The resorcinol can be recovered from the aqueous extract phase by evaporation or by extraction e. g. in a counter-current extraction apparatus, with a low-boiling inert organic solvent from which it is subsequently obtained by any suitable method such as evaporation of the solvent. The additional resorcinol obtained in this way is usually of a low purity, and may advantageously be recycled to the still. The resorcinol-free inert substance phase may be treated for the recovery of the meta-isopropenyl phenol for example by extraction with a dilute aqueous alkaline solution, followed by acidification of the alkali extract to precipitate an oil phase which can be fractionated to isolate the meta-isopropenyl phenol.

The following examples show how the invention may be carried out in practice. The parts by weight and parts by volume bear the same relationship to each other as do kilograms to litres.

*Example 1*

A solution of crude meta-di-isopropylbenzene dihydroperoxide (94.2% pure by iodimetric anlysis) containing 200 parts by weight as pure dihydroperoxide was submitted to acidic cleavage at the boiling-point of the mixed acetone/benzene solvent using as catalyst 20 parts by weight of an acid treated fuller's earth. The resulting mixture, from which the acidic cleavage catalyst and low boiling materials such as acetone and solvent had been removed, was submitted to fractional distillation at 10 mm. of mercury pressure. After a main fraction consisting of 56.2 parts by weight of resorcinol had been recovered the kettle temperature was allowed to rise to about 200° C. when the decomposition of the material in the kettle commenced and the head temperature of the column fell. Thereafter a fraction was collected which comprised a mixture of meta-isopropenyl phenol and resorcinol. From this fraction 24.9 parts by weight of resorcinol were obtained by washing out the meta-isopropenyl phenol with benzene. Distillation of the benzene solution resulted in a recovery of 9.5 parts by weight of the meta-isopropenyl phenol together with a small amount of high boiling residue.

*Example 2*

A portion of the crude meta-di-isopropylbenezene dihydroperoxide used for the Example 1 was recrystallised twice from a benzene-petroleum ether mixture to yield a meta-di-isopropylbenzene dihydroperoxide of a purity of 99.1% (by iodimetric analysis).

200 parts by weight of this purified dihydroperoxide were submitted to acidic cleavage in a similar way to that adopted in Example 1. After removal of the catalyst and low boiling materials from the resulting mixture, fractional distillation at a pressure of 10 mm. of mercury yielded fractions containing 78.5 parts by weight of resorcinol. The kettle temperature was then allowed to rise to above about 200° C. when decomposition commenced causing the head temperature to fall about 10° C. when a fraction comprising meta-isopropenyl phenol and resorcinol was collected. Treatment of this fraction as in Example 1 yielded 10.0 parts by weight of resorcinol and 2.85 parts of meta-isopropenyl phenol.

*Example 3*

The reaction product obtained by decomposing a 4% weight/volume solution of m-di-isopropylbenzene dihydroperoxide in benzene with an acid clay catalyst was filtered free of catalyst, and to it was added 10% by volume of D. C. 550 silicone fluid (Dow Corning Co.). After removing the benzene by distillation, the resorcinol was distilled out of the residual mixture at a pressure of 10 mm., a slow stream of nitrogen being allowed to bubble through the contents of the distillation flask, which was maintained at a temperature of about 200° C. Distillation ceased after 11.9 parts by weight of product had been collected. This product had a melting point of 95° C. and represented resorcinol of a purity of 88.1%. On recrystallisation from benzene 7.7 parts by weight of pure product were obtained.

On raising the temperature above 200° C. distillation recommenced and continued until the kettle temperature reached 320° C. At this stage distillation ceased once more. A further 3.1 parts by weight of crude product were obtained during this stage which yielded 2.2 parts by weight of pure resorcinol on recrystallisation from benzene. The benzene mother-liquors contained meta-isopropenyl phenol which could be recovered by distillation.

By contrast the same volume of a similar reaction product solution was filtered free of catalyst, and the benzene distilled off. The viscous residue remaining was then distilled at reduced pressure, first at 10 mm., and finally at 1.0 mm. The distillate solidified on cooling to a yellow crystalline mass (10.7 parts by weight) melting at 94–98° C. After recrystallisation once from hot benzene, the melting point was raised to 106–108° C. and the weight was reduced to 7.4 parts by weight. The residue left in the distillation kettle which was extremely viscous while hot, set on cooling to a hard brittle solid or coke, which had to be chipped out of the kettle.

*Example 4*

195 parts by weight of a crude oxidation product containing 81.5% weight/weight of meta-di-isopropylbenzene dihydroperoxide were decomposed using an acid catalyst. The product from the decomposition was neutralised and stripped of solvents, and to the stripped residue was added 500 parts by volume of methyl naphthalene and the mixture distilled at atmospheric pressure (vapour temperature 240–242° C.). Fractions of the distillate of approximately 200 parts by volume were collected and cooled, the resorcinol which crystallised from the distillate being filtered off, and the filtrate returned to the distillation kettle. This process was continued until no more resorcinol crystallised from the distillate on cooling, after which the remainder of the methylnaphthalene in the kettle was distilled off. The total weight of resorcinol (of 99.73% purity) obtained in this way was 51.5 parts by weight (a 54% yield based on the crude hydroperoxide).

The methylnaphthalene mother-liquors were then washed with two portions of 50 parts by volume of water to remove any traces of resorcinol remaining, after which they were extracted with three portions of 75 parts by volume of 2N.sodium hydroxide, and washed once more with water. After heating to drive off the water, the methylnaphthalene was then ready to work up the next batch of decomposition product.

The sodium hydroxide extract was washed with ether and then acidified with carbon dioxide. The precipitated oil was extracted with ether, the extract dried, the ether distilled off, and the residue distilled at 10 mm. pressure under nitrogen cover.

The distillate, B. P. 118–121° C./12 mm., weighed 16.3 parts by weight and was crude meta-isopropenyl phenol. This product was found suitable for fractional distillation to recover the meta-isopropenyl phenol in a substantially pure state.

*Example 5*

To a similar volume of a decomposition reaction product solution comparable to that of Example 3, filtered free of catalyst, was added 25% by volume of a mixture of 1- and 2-methylnaphthalene. After stripping off the benzene, the residual solution of reaction products in methylnaphthalene was distilled through a column packed with single-turn glass helices, at a reuflx ratio of 3:1, at atmospheric temperature. The temperature of distillation was 240–243° C. On cooling the distillate, resorcinol separated from it as pure white crystals. These were filtered off, and the filtrate returned to the distillation kettle and distillation continued until the distillate no longer deposited crystals of resorcinol on cooling. The total amount of resorcinol obtained after washing with 40–60° C. petroleum ether, and drying in an oven at 90° C., was 11.1 parts by weight, melting point 111° C., and was completely colourless. The distillate mother-liquors contained meta-isopropenyl phenol which could be recovered, for example, by extraction with alkali, followed by acidification and distillation steps as described in Example 4.

*Example 6*

195 parts by weight of crude meta-di-isopropylbenzene dihydroperoxide were decomposed using an acid catalyst. The cleavage product was treated for the neutralization of the catalyst and was stripped of low-boiling solvents. The hot residue was then run into a flash boiler maintained at 300–320° C., the distillate vapours being taken off through an anti-splash head and condensed by contacting with water. The whole operation was conducted at a pressure of 10 mm. of mercury. After the distillation was completed, the product was diluted to approximately 200 parts by volume with more water, and the aqueous solution extracted three times with 50 parts by volume portions of benzene, the combined benzene extracts being back extracted with 20 parts by volume portions of water. The combined aqueous solutions were then stripped of water at 10 mm. pressure, and the residue distilled without fractionation at the same pressure, to give 48.0 parts by weight of resorcinol, with a bulk freezing point of 106° C.

The benzene extracts on removal of the benzene and distillation of the residue at 10 mm. pressure under nitrogen cover, gave 16.5 parts by weight of m-isopropenyl-phenol, B. P. 118° C./10 mm.

*Example 7*

The product from the cleavage of 133 parts by weight of crude meta-diisopropylbenzene dihydroperoxide in benzene solution, was stripped of solvents after filtering off the acid-activated fuller's earth cleavage catalyst. To the solvent-free residue was then added methylnaphthalene and the mixture distilled at a pressure of 10 mm. of mercury, the temperature being 110° C. The distillate was cooled, and the crystalline resorcinol which separated was filtered off, the filtrate being returned to the distillation kettle, and distillation resumed. This was repeated until no more resorcinol separated from the distillate on cooling. The amount of pure resorcinol recovered in this way was 33.3 parts by weight.

To the residue from the above distillation was added further fresh methylnaphthalene, and the above procedure repeated at atmospheric pressure, at a temperature of 240°–243° C. In this way, a further 6.6 parts by weight of crystalline resorcinol were obtained from the distillate. The distillate mother-liquors contained meta-isopropenyl phenol which could be recovered by extraction with alkali, followed by acidification and distillation as described in Example 4.

I claim:

1. In the process for the production of resorcinol by catalytic cleavage of a reaction mixture containing m-di-isopropylbenzene dihydroperoxide wherein resorcinol and a higher boiling residue are produced, the improvement which comprises decomposing said residue by heating at a temperature in the range of 200°–400° C. and recoving resorcinol and m-isopropenyl phenol as decomposition products.

2. In the process for the production of resorcinol by catalytic cleavage of a reaction mixture containing m-di-isopropylbenzene dihydroperoxide wherein resorcinol and a higher boiling residue are produced, the improvement which comprises decomposing said residue by heating in the presence of an inert organic solvent having a boiling point above 200° C./760 mm. at a temperature in the range of 200°–400° C. and recovering resorcinol and m-isopropenyl phenol as decomposition products.

3. The process of claim 1 in which the resorcinol is recovered from the decomposition products by distillation of a resorcinol—m-isopropenyl phenol fraction, crystallizing the resorcinol portion thereof and subsequently filtering the resorcinol from the mixture.

4. The process of claim 3 in which the distillate from which the resorcinol has been filtered is extracted with water to remove residual resorcinol.

5. The process of claim 1, in which the resorcinol is recovered from the decomposition products by distillation of a resorcinol—m-isopropenyl phenol fraction, extracting the resorcinol from said fraction by partition between water and a water-immiscible volatile organic solvent and recovering resorcinol from the water phase.

6. The process of claim 1 in which the resorcinol is recovered from the decomposition products by distilling off a fraction containing the resorcinol.

7. The process of claim 6 in which meta-isopropenyl phenol is separated from the resorcinol fraction by extraction with a solvent of the group consisting of benzene, toluene, methyl naphthalene, chloroform and carbon tetrachloride.

References Cited in the file of this patent

UNITED STATES PATENTS

| 1,696,658 | Trumble | Dec. 25, 1928 |
| 2,422,163 | Dixon | June 10, 1947 |

FOREIGN PATENTS

| 968,209 | France | Apr. 12, 1950 |
| 496,061 | Belgium | June 15, 1950 |